E. J. WELCH.
SPRING SUSPENSION FOR AUTOMOBILE TRUCKS.
APPLICATION FILED AUG. 4, 1916.
1,213,314.
Patented Jan. 23, 1917.
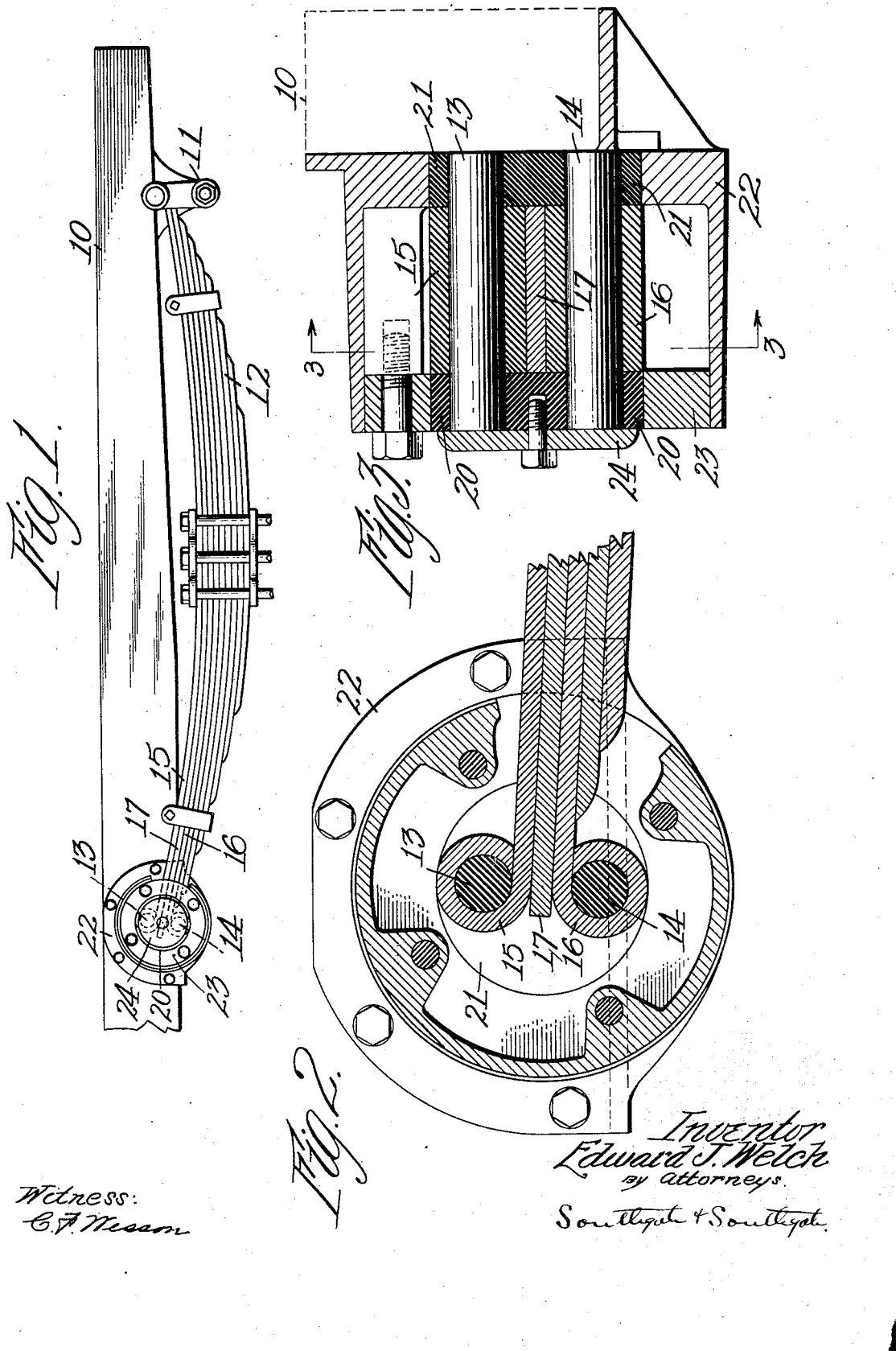

UNITED STATES PATENT OFFICE.

EDWARD J. WELCH, OF FITCHBURG, MASSACHUSETTS.

SPRING SUSPENSION FOR AUTOMOBILE-TRUCKS.

1,213,314.  Specification of Letters Patent.  Patented Jan. 23, 1917.

Application filed August 4, 1916.  Serial No. 113,094.

*To all whom it may concern:*

Be it known that I, EDWARD J. WELCH, a citizen of the United States, residing at Fitchburg, in the county of Worcester and State of Massachusetts, have invented a new and useful Spring Suspension for Automobile-Trucks, of which the following is a specification.

This invention relates to a spring and means for attaching the same to an automobile truck, and the principal objects thereof are to provide a construction which will eliminate a very large percentage of the breakage of springs of this character by providing a double connection for the spring, and arranging it so that the two connections will not interfere with each other or cause binding of the parts. In other words the two connections will give and play so that there will be no chance of the whole load being thrown on either one.

The invention also involves improvements in the details of construction and of the parts as will appear.

Reference is to be had to the accompanying drawings in which—

Figure 1 is a side elevation of part of the frame of an automobile truck showing a preferred embodiment of this invention applied thereto; Fig. 2 is a sectional view of the means for connecting the spring with the frame, taken on the line 3—3 of Fig. 3, and Fig. 3 is a central transverse sectional view of Fig. 2.

The invention is capable of use on other vehicles than automobile trucks, but its principal utility is in connection with that class of vehicles, and it is shown herein as applied to one having an ordinary type of frame 10, and provided with the usual shackle 11 for connecting with one end of a semi-elliptical spring 12. At the other end this spring is modified from the general construction by having means for connecting it with two pins 13 and 14.

The top leaf 15 of the spring is connected with the pin 13 by being bent around it upwardly, as is well understood in this art. There is a similar leaf 16 below the leaf 15 which is curved downwardly at the end around the pin 14. These two leaves 15 and 16 are substantially the same length. They can constitute the two top members of the spring, but I prefer to place a leaf 17 between them projecting beyond the ends of both of the others. These constitute the three upper leaves of the spring. They are supported by the usual lower leaves below. These two pins 13 and 14 are not rigidly connected with the chassis of the vehicle, but are mounted on two plates 20 and 21 which can be regarded as a supporting member interposed between the spring and chassis. They are made free to turn in a hub 22 that is bolted to the chassis in an obvious manner. This hub and its fixed cover 23 are provided with cylindrical inner surfaces on which the plates 20 and 21 bear and any desired form of anti-friction devices can be used at these surfaces if so desired. The ends of the pins 13 and 14 are adapted to come nearly against the surface of the chassis or any other plane surface inside, and on the outside they are held in place by a cover 24 bolted to the plate 20. It will be seen therefore that the ends of the three spring leaves 15, 16 and 17 are located between the plates 20 and 21, and extend outwardly through a passage in the hub 22 in which they have plenty of play.

In the use of the device it is obvious that if there is any tendency to place the entire weight, or more than half of it, on either one of the pins 13 and 14 by forcing the end of the corresponding spring leaf longitudinally in either direction the other pin will turn and in fact the whole structure inside the hub will turn immediately to accommodate this strain and throw the strain equally on the two pins and on the two leaves. In this way a double suspension is secured so that neither one of the two leaves 15 or 16 has to bear the entire load at any time, and in fact it is found that the weight on both leaves is equalized. The function of the leaf 17 is to help strengthen both of the others, and projecting beyond their ends as it does, it holds them at all times at the point where the greatest strain comes. In this way a very material percentage of the breakage of the springs is obviated, and in fact most of it is. Furthermore, if desired, springs on lighter vehicles can be made in this way and the springs in that case can be made considerably lighter than they are now.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described, but What I do claim is:

1. In a spring suspension for a vehicle body, the combination of a leaf spring, a pair of pins, one connected with each of two parallel leaves of the spring for supporting the vehicle frame therefrom, said parallel leaves being rigidly connected at their centers, and means whereby said pins are rigidly connected together, but are capable of turning on an axis located between them to accommodate the two leaves.

2. In a device of the character described, the combination of a semi-elliptical leaf spring, a vehicle body having a stationary hub thereon, a supporting member pivotally connected with said hub and adapted to swing freely with respect thereto, and two connections connected with the ends of separate leaves of said spring and fixed to the supporting member.

3. In a device of the character described, the combination with an automobile truck chassis having a hub provided with a cylindrical socket, of a pair of circular plates for supporting it located and adapted to turn together in said socket, a pair of pins having their ends supported by said plates and movable therewith, a spring connected to said chassis at one end and having at the other end two leaves adapted to have freedom of motion independently of each other, one connected to each of said pins.

4. In a device of the character described, the combination with an automobile truck chassis having a fixed hollow hub thereon, of a pair of circular plates located in said hub and adapted to turn on a central axis, a pair of pins having their ends supported by said plates and movable therewith, a semi-elliptical spring connected to said chassis at one end and having at the other end two leaves adapted to have freedom of motion independently of each other, one connected to each of said pins, said leaves being turned over at their ends around the respective pins, and a substantially flat leaf located between them and projecting beyond their ends.

5. In a spring suspension for a vehicle body, the combination of a leaf spring, a pair of pins, one connected with each of two leaves of the spring for supporting the vehicle frame therefrom, means whereby said pins are rigidly connected together, but are capable of turning on an axis located between them to accommodate the two leaves, said spring having a straight ended leaf between said two leaves.

In testimony whereof I have hereunto affixed my signature.

EDWARD J. WELCH.